July 14, 1925.
P. KLEIN
LOCK
Filed April 30, 1924
1,545,962
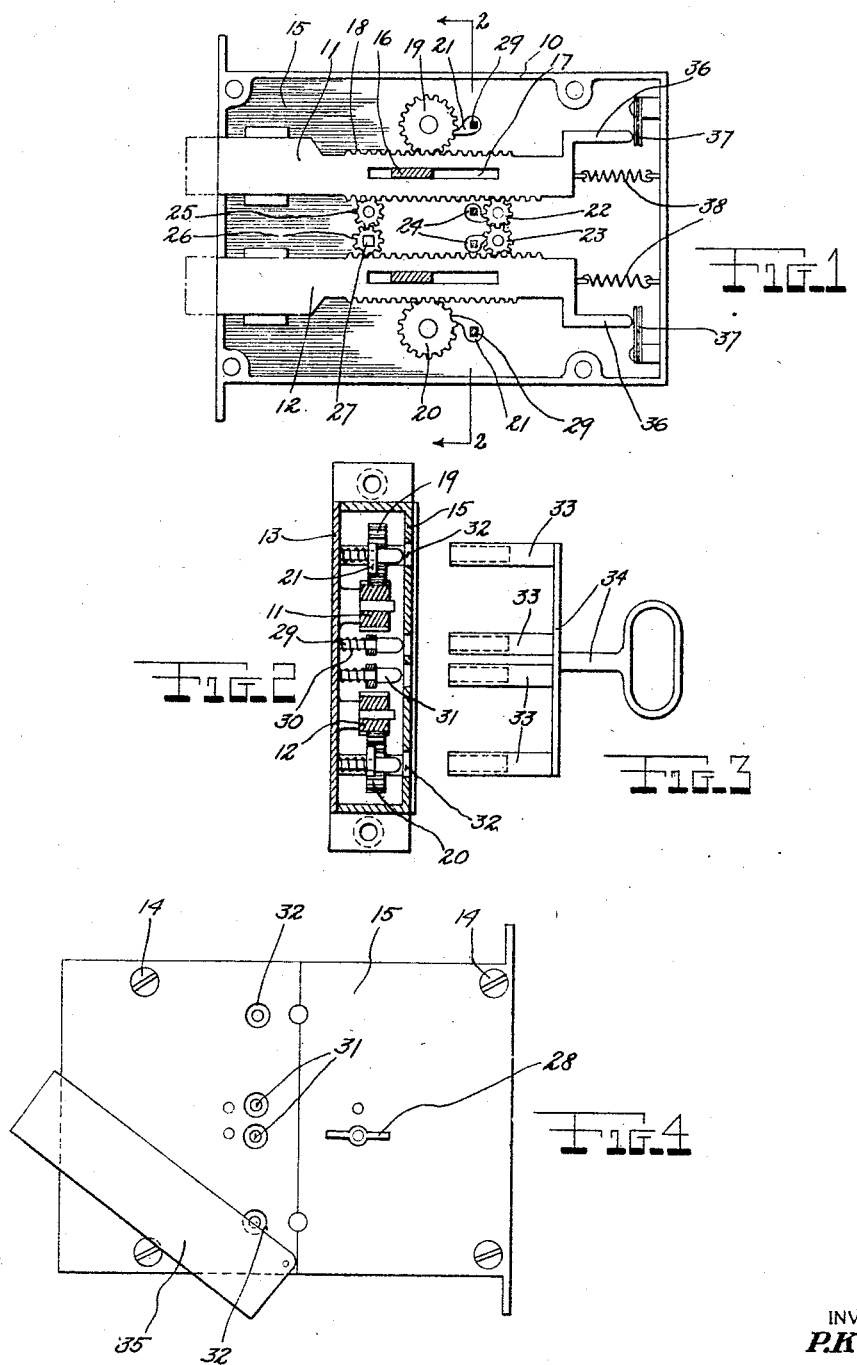

Patented July 14, 1925.

1,545,962

UNITED STATES PATENT OFFICE.

PETER KLEIN, OF ELIZABETH, NEW JERSEY, ASSIGNOR OF ONE-HALF TO EMMA VON DER HÜLLZ, OF NEW YORK, N. Y.

LOCK.

Application filed April 30, 1924. Serial No. 709,951.

*To all whom it may concern:*

Be it known that I, PETER KLEIN, a citizen of Germany, residing at Elizabeth, in the county of Union and State of New Jersey, have invented certain new and useful Improvements in Locks, of which the following is a specification.

The main object of this invention is to provide a lock having locking bolts provided with rack teeth which are engageable with gears, the latter being normally locked in place by pawls which are disengaged from said gears by a transverse movement thru manipulation of a key. The lock is also provided with an electrical alarm sounding means which is actuated when the bolts are retracted or opened. By the construction mentioned it is possible to secure the locking bolts in both the extended and retracted position, and cannot be moved except with the aid of the special type of key provided for the purpose.

This and other objects will become apparent in the description below, in which characters of reference refer to like-named parts in the drawing.

Referring briefly to the drawing, Figure 1 is a front elevational view of the lock, the cover being removed to show the bolt actuating means.

Figure 2 is a cross sectional view taken on line 2—2 of Figure 1.

Figure 3 is a side elevational view of the key used to extend the locking bolts.

Figure 4 is a side elevational view of the lock showing the hinged cover for protecting the key openings in open position.

Referring in detail to the drawing, the numeral 10 indicates the rectangular casing of the lock. Within this casing a pair of locking bolts 11 and 12 are slidably mounted and are completely enclosed by a cover plate 13 which is secured in place by screws 14. The rear wall 15 of the casing has rectangular studs 16 projecting from its inner face and are engaged in slots 17 formed longitudinally in the locking bolts. Both of the side surfaces of the locking bolts 11 and 12 are provided with rack teeth 18. Gears 19 and 20 are mounted on studs and the teeth of said gears mesh with the rack teeth 18 on the opposing sides of the locking bolts 11 and 12. These gears are engaged by pawls 21 which permit an extensible movement of the locking bolts 11 and 12 but prevent retraction of the same. A pair of smaller gears 22 and 23 are rotatably mounted on studs between the locking bolts 11 and 12 and the teeth on the gear 22 are in continual mesh with the teeth on the slide bolt 11, the opposite gear 23 being in mesh with the gear 22 and the rack teeth 18 of the bolt 12. These gears 22 and 23 are also provided with pawls 24 which are mounted on elements to be hereinafter more fully described. Nearer the front ends of the locking bolts 11 and 12 and therebetween, additional pinions 25 and 26 are mounted in the casing on suitable studs and are mutually in mesh with each other and the rack teeth of the corresponding locking bolt. The stud 27 upon which member 26 is mounted is rigid with the gear and the end which extends or protrudes thru the casing has a wing nut 28 secured thereto. All of the pawls 21 and 24 are slidably supported on spindles 29 which are square in cross section at their lower ends and have springs 30 coiled thereon. On the square portions of the spindles 29, the pawls 21 and 24 are supported so that they are incapable of being rotated, but may be slid longitudinally on said spindles. The upper ends of the spindles are round in cross section and provide guide pins 31, the pawls normally being shouldered where the guide pins meet the square portions of the spindles. These spindles are all aligned in a vertical plane and the tops of the guide pins 31 are visible thru openings 32. These openings are adapted to receive the sleeve projections 33 which extend from the key 34, the free ends of said sleeves being hollow and are adapted to insert over the guide pins 31 and engage the pawls 21 and 24 in order to depress the latter. At the position where the openings 32 pass thru the rear wall 15 of the casing, a cover 35 is pivoted at one of its lower corners and is adapted to cover the openings 32 to conceal the latter when they are not in use. The legs 36 extend rearwardly of the bolt and are cooperative with current carrying blades 37 which may be connected thru a vertical source to a bell or buzzer to give an audible alarm when the locking bolts have been shifted to the retracted position. These locking bolts are retracted from the projected position by springs 38 which are secured to the locking bolts 11 and 12 and the wall of the casing.

When the locking bolts 11 and 12 are in the retracted position, the door is opened, as said locking bolts do not in this position engage the keeper, not shown in the drawings. To extend the locking bolts, the wing nut 28 is rotated in the proper direction, thus causing the gears 25 and 26 which mesh with the rack teeth 18 on said locking bolts to advance the latter to the position shown by the dotted lines in Figure 1. During the extensible movement of the locking bolts 11 and 12, all of the pawls 21 and 24 will trip over the teeth of the gears which they cooperate with. When the locking bolts are extended and it is desired to open or retract said bolts, the sleeves 33 of the key 34 are inserted thru the openings 32 and are permitted to fit over the guide pins 31. By depressing the sleeves downwardly, the pawls 21 and 24 are simultaneously given a sidewise movement in the direction of the cover 13 and are thus disengaged from the gears 19, 20, 22, and 23. After these pawls are disengaged from their respective gear members, the springs 38 urge the locking bolts 11 and 12 rearwardly to the open position whereupon arriving at the open position, contact between the blades 37 is caused and the alarm given. Upon removing the sleeves 33 of the key 34 from the openings 32 in the lock, the pawls will again be lifted into engagement with the teeth of their respective gears thru the medium of the springs 30 mounted on the spindles 29. When these pawls are in cooperative engagement with the teeth of their respective gear wheels, the locking bolts may be moved outwardly but cannot be slid in the opposite direction.

I claim:—

1. In a lock, a casing, a pair of locking bolts slidable therein, the sides of said bolts having rack teeth extending lengthwise thereon, a pair of gears rotatably mounted adjacent the sides of said bolts and engageable with the rack teeth thereon, an additional pair of smaller gears rotatably mounted between the locking bolts, said smaller gears being in mesh with each other and with the rack teeth on the mutually adjacent sides of the bolts, means engaging all of said gears for preventing rotation of the same in one direction, said gears in locked engagement with said means being adapted to retain the locking bolts in extended position, and additional means for disengaging the gear locking means from engagement with said gears.

2. In a lock, a casing, a pair of locking bolts slidable therein, the sides of said bolts having rack teeth extending lengthwise thereon, a pair of gears rotatably mounted adjacent the sides of said bolts and engageable with the rack teeth thereon, an additional pair of smaller gears rotatably mounted between the locking bolts, said smaller gears being in mesh with each other and with the rack teeth on the mutually adjacent sides of the bolts, non-rotatable pawls engaging said gears and locking the latter in position, a key adapted to engage said bolts and depress the same out of engagement with said gears, and means for lifting said pawls into engaged position with the gears when a pressure on the pawls has been removed.

3. In a lock, a casing, a pair of locking bolts slidable therein, the sides of said bolts having rack teeth extending lengthwise thereon, a pair of gears rotatably mounted adjacent the sides of said bolts and engageable with the rack teeth thereon, an additional pair of smaller gears rotatably mounted between the locking bolts, said smaller gears being in mesh with each other and with the rack teeth on the mutually adjacent sides of the bolts, spindles fixed in the casing adjacent the gears, pawls slidably mounted on said spindles, springs on said spindles normally lifting said studs upwardly, a key having sleeves thereon, the sleeves being adapted to depress said pawls against the tension of said springs to urge said pawls out of engagement with the gears and permit rotation of the latter, and an additional pair of gears engaging said locking bolts adapted to retract said locking bolts when rotated after the pawls are in disengaged position.

4. In a lock, a casing, a pair of locking bolts slidable in said casing, said bolts having rack teeth on its longitudinal sides, gears engaging said rack teeth, spindles square in cross section adjacent each of said gears and aligned in a vertical plane, pawls slidably mounted on said spindles, studs of larger dimension surmounting said spindles, springs urging said pawls upwardly into engagement with the gears, a key having a plurality of hollow sleeves thereon, said sleeves being adapted to pass thru the casing and insert over the studs and depress the pawls out of engagement with the gears, additional springs being adapted to retract the locking bolts when the pawls are released from said gears, an additional pair of gears meshing with said locking pawls and each other, a wing nut on one of said gears which when rotated being adapted to extend said locking bolts, and a cover pivoted on said casing being adapted to conceal the openings in said casing thru which the sleeves on the key are inserted.

In testimony whereof I affix my signature.

PETER KLEIN.